Figure 1:
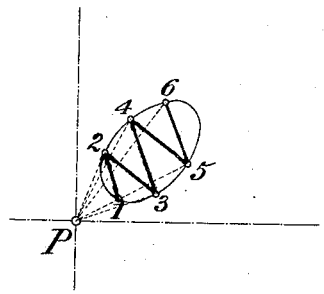

K. KELLER.
JACQUARD EMBROIDERING MACHINE.
APPLICATION FILED APR. 11, 1912.

1,082,228.

Patented Dec. 23, 1913.

5 SHEETS—SHEET 1.

Witnesses

Inventor
Karl Keller
By _____
Attorney

K. KELLER.
JACQUARD EMBROIDERING MACHINE.
APPLICATION FILED APR. 11, 1912.
1,082,228.
Patented Dec. 23, 1913.
5 SHEETS—SHEET 2.
FIG _4_
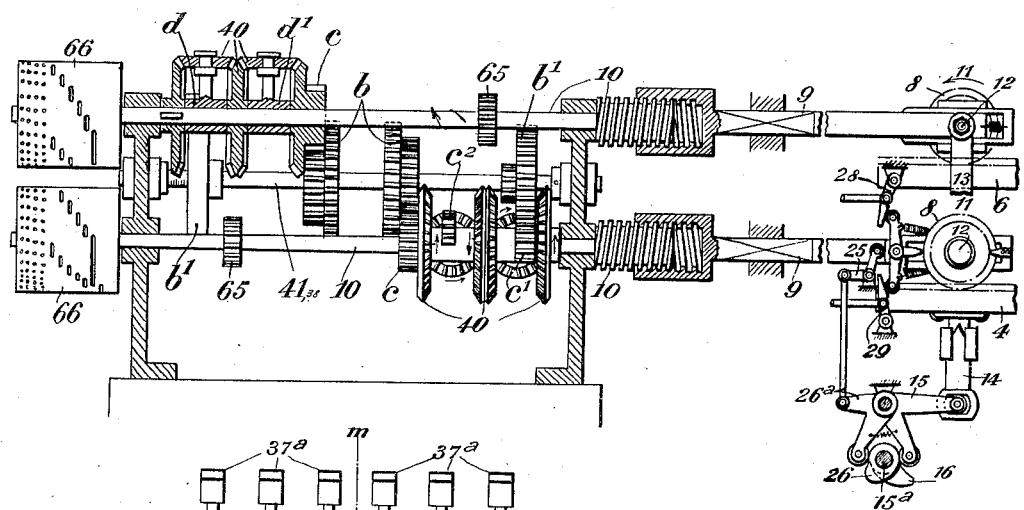
FIG _5_
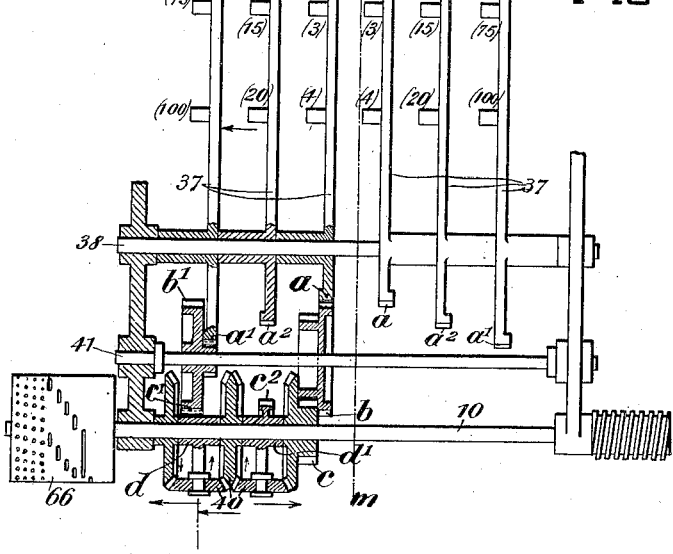
Witnesses
Inventor
Karl Keller
By H. van Dedemel
Attorney

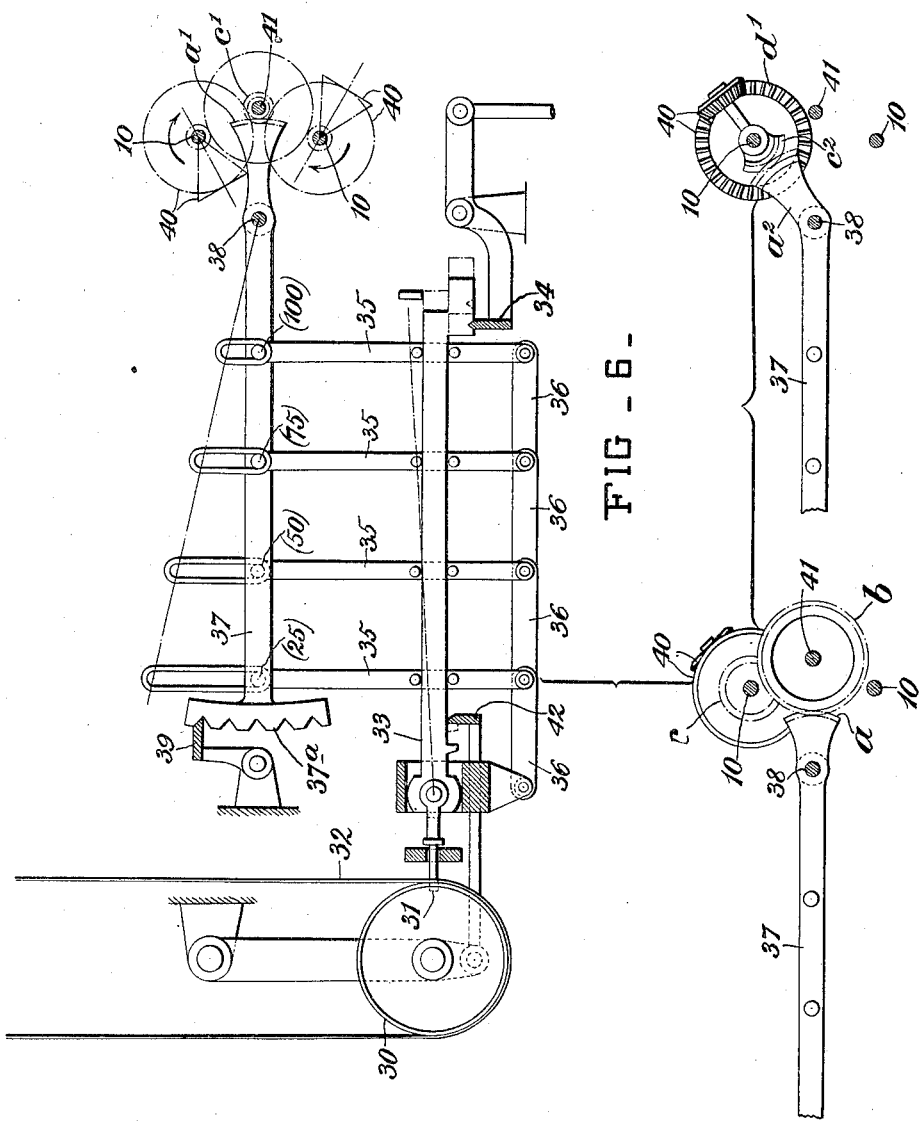

K. KELLER.
JACQUARD EMBROIDERING MACHINE.
APPLICATION FILED APR. 11, 1912.
1,082,228.
Patented Dec. 23, 1913.
5 SHEETS—SHEET 4.
FIG_7. FIG_8.
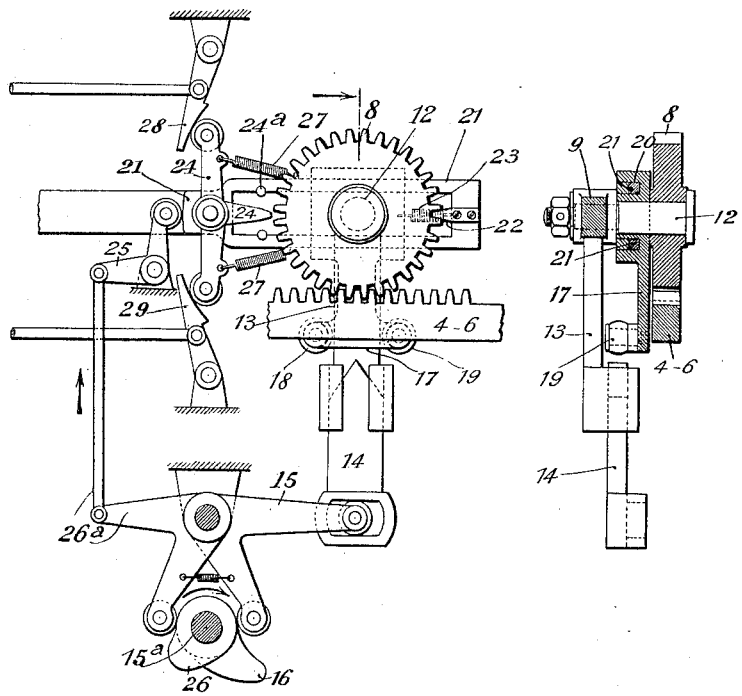
FIG_9. FIG_10.
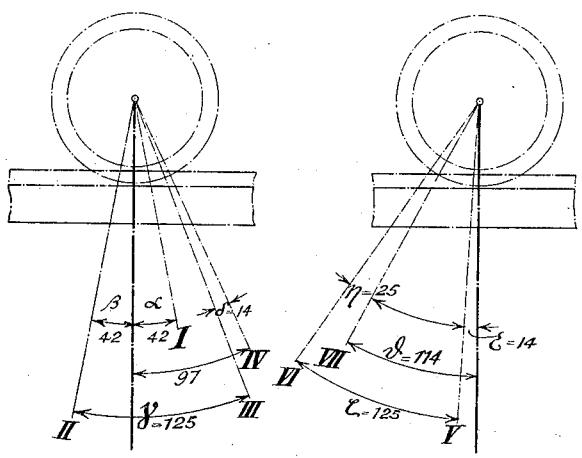
Witnesses
F. H. Logan
Alfred R. Anderson
Inventor
Karl Keller
By H. van Dedemval
Attorney K. KELLER.
JACQUARD EMBROIDERING MACHINE.
APPLICATION FILED APR. 11, 1912.
1,082,228.
Patented Dec. 23, 1913.
5 SHEETS—SHEET 5.
FIG. 11.
FIG. 12.
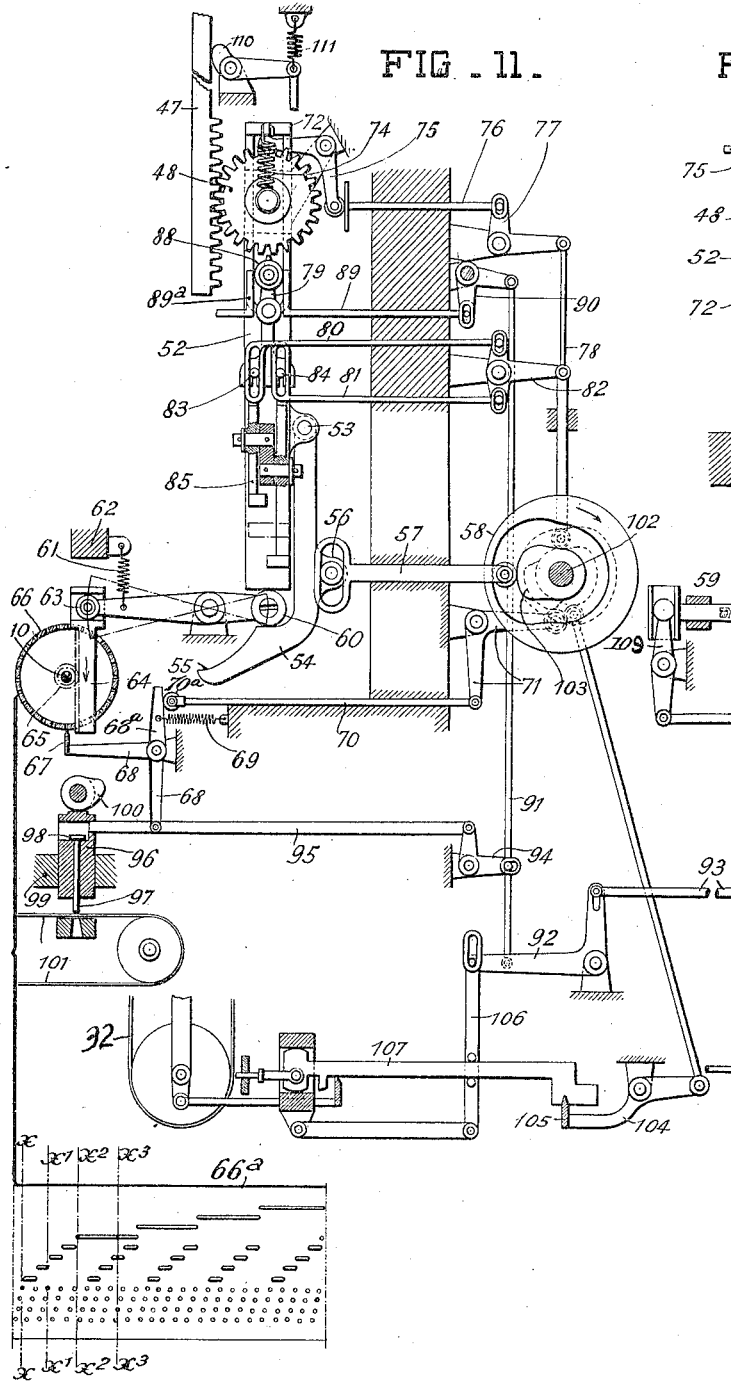
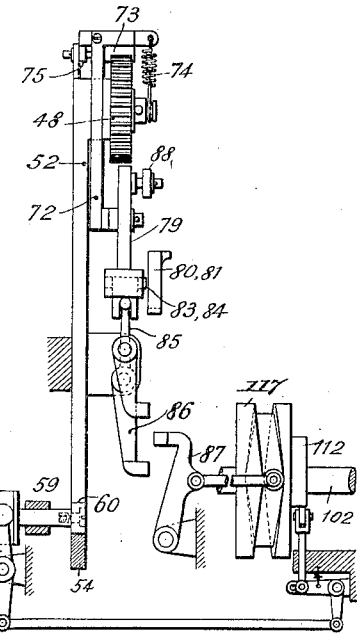
Witnesses
F. H. Logan
Alfred R. Anderson
Inventor
Karl Keller
By H. van Dedeurwel
Attorney

UNITED STATES PATENT OFFICE.

KARL KELLER, OF ARBON, SWITZERLAND.

JACQUARD EMBROIDERING-MACHINE.

1,082,228.  Specification of Letters Patent.  Patented Dec. 23, 1913.

Application filed April 11, 1912. Serial No. 690,128.

*To all whom it may concern:*

Be it known that I, KARL KELLER, a citizen of the Swiss Republic, and resident of Arbon, Switzerland, have invented new and useful Improvements in Jacquard Embroidering-Machines, of which the following is a full, clear, and exact specification.

The present invention is based on a new stitch determining, or fabric frame positioning method of jacquard embroidering machines.

The difference between the present stitch determining method and the hitherto known arrangements consists in the fact that, while using of the well known decomposing of the stitch-length into two components, the determination of each stitch point within a specified range of work of the embroidery is obtained by its two distance components away from a fixed zero point or pole position in the jacquard mechanism to which the positioning or adjusting gear of the same is brought back after each movement of the fabric frame, while in systems hitherto known the horizontal and vertical distances of the stitch points were generally dependent on the last stitch made. Should, for instance, according to Figure 1 of the accompanying drawing, stitches 1 to 6 in sequence be made within a given field of work, then according to the present invention this is done by using a jacquard card perforated in such a manner that all stitch points are successively controlled from the adjusting gear of the jacquard mechanism by their horizontal and vertical distance components from one and the same zero or pole point P. It is advisable in this respect to take care that the jacquard mechanism is temporarily disengaged from the fabric frame so that the latter need not require to be brought from the stitch point arrived at, back again to the pole point position. Owing to the fact that the zero or pole point position for the adjusting strokes in jacquard mechanism is a fixed one for a determined field of work of the embroidery, any error in the stitch position which may have occurred is not transmitted to the following stitches, but owing to the return of the position determining or adjusting gear of the jacquard mechanism to the fixed pole point position, it has no influence on the later following stitches. A practical construction for carrying out this method would, however, necessitate a great number of stitch length combinations if all stitch points for a complicated design were determined from a single pole point. In order to avoid this, in decomposing the design into single fields of work, the determination of the stitch points within these single fields of work are preferably obtained by using for each of these a distinct pole point position in the gear of jacquard mechanism in such a manner that when the stitch passes from one field of work to another the pole point position is simultaneously changed so that in the new field of work the stitch length only need be controlled from its corresponding pole point. Should, for instance, according to Fig. 2 the stitch points 1 to 6 of a design divided into four fields of work be determined by a correspondingly perforated jacquard card, then the stitch points 1 and 3 lying in one field of work will be determined from the pole point $P^1$ of this field of work, while the stitch points 2 and 4 of a second field of work will be controlled from its pole point $P^2$, the stitch point 5 of a third field of work will be controlled from its pole point $P^3$ and the stitch point 6 in a fourth field of work from its pole point $P^4$, each being determined by its horizontal and vertical components. The pole points $P^1$, $P^2$, $P^3$ and $P^4$ lying at constant distances one from the other can be, independently of the succession of stitches 1 to 6, automatically changed by a change device in the jacquard mechanism by means of additional jacquard needles provided for this purpose. The distances of the pole points from each other are so selected that they are equal to the largest possible stitch length combination.

The mechanism for carrying out this method consists essentially of a position determining or adjusting gear controlled by the jacquard card which is used to determine the distance components of a stitch point from a pole point without a rigid connection with the fixed fabric frame, whereby the pole point serving continuously for the correction of the stitch positions according to the design to be carried out, will either remain unaltered or will be changed for a neighboring pole point by a change device controlled by the jacquard card, while after this position determining or adjustment of the jacquard gear to the stitch point the fabric frame is brought out of the previous stitch point position into the new gear adjusted position by a positive positioning device independent of the position determining gear and separate for each movement component, whereupon the position determining gear again disengaged, moves back to the starting position corresponding to the previous pole point.

In the accompanying drawing is illustrated a jacquard-embroidering machine constructed according to the present invention, which machine is not only designed for the embroidering operation, but also for the punching and repeating of jacquard cards. This machine possesses in combination with the jacquard-mechanism a pantograph controlled fabric moving mechanism, a jacquard-card punching mechanism and a jacquard card-repeating mechanism in such a manner that the machine can operate on the one hand according to a given jacquard-card as an automatic embroidering machine, as well as a jacquard-card repeating machine with or without simultaneous automatic operation of the embroidering machine, on the other hand when being operated manually, with the use of the position determining or adjusting gear of the jacquard mechanism, as a half automatic embroidering machine, as well as a jacquard-card punching machine, whereby the embroidering machine may simultaneously operate as auxiliary machine with automatic fabric moving for allowing the operator to control or verify the work.

Figure 2:
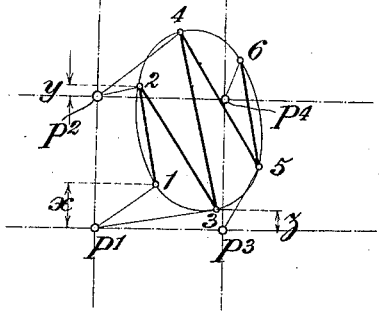
Figure 3:
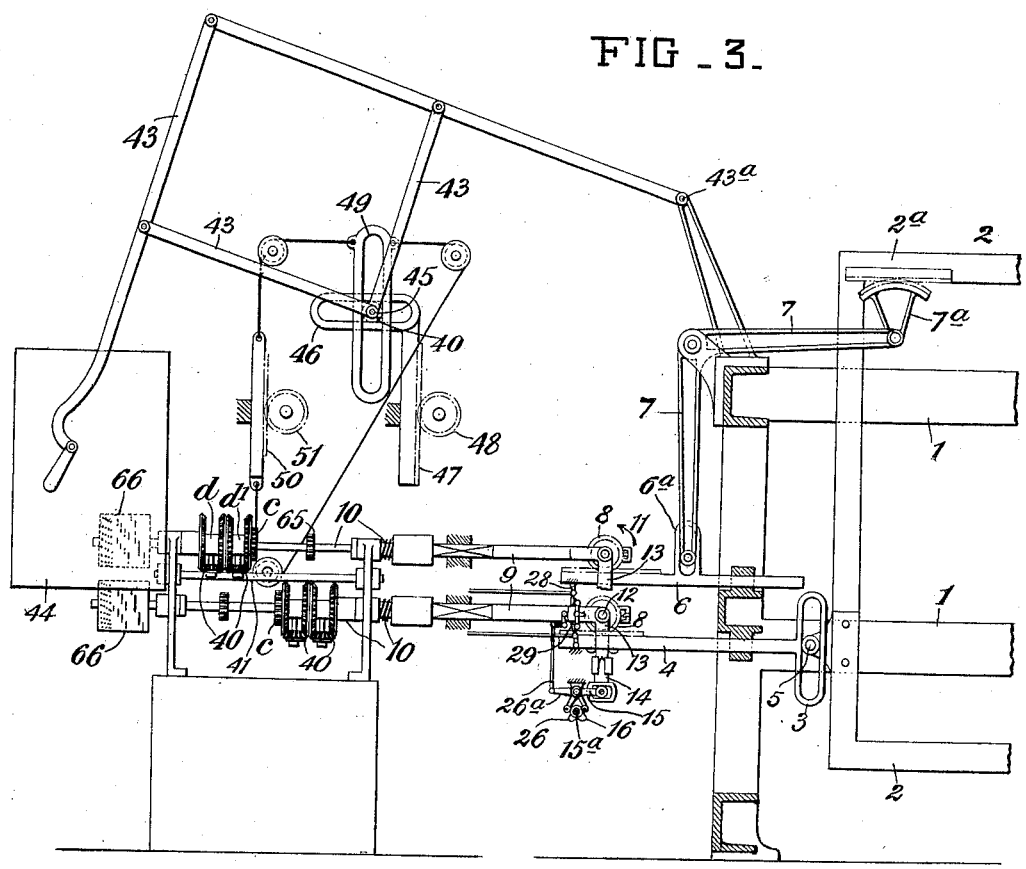

Figs. 1 and 2 show the two embroidery-pattern schemes above referred to. Fig. 3, is a diagrammatic front view of a part of an embroidering machine together with a jacquard apparatus for automatically moving the fabric frame and with a pantograph controlled fabric moving mechanism, according to the present invention. Fig. 4 is a view on a larger scale partly in vertical section of the position determining and adjusting gear of the jacquard mechanism. Fig. 5 is a plan view, partly a horizontal section of the selecting and adjusting means with a wheel gear of the jacquard mechanism. Fig. 6 is a section on line $m$—$m$ of Fig. 5, together with the jacquard-card for controlling the selecting and adjusting mechanism, whereby the aforesaid wheel gear is also represented in two further sections. Fig. 7 is a front view and Fig. 8 a vertical section of the fabric frame positioning mechanism as well as the pole point changing device. Figs. 9 and 10 show two angle-schemes for the explanation of the mode of operation of the jacquard mechanism. Fig. 11 represents in side-view one of the adjusting means of the pantograph controlled fabric moving mechanism, together with the card punching mechanism, whereby the proper embroidering mechanism may at the same time serve as control embroidering-machine; in this figure is also indicated the jacquard-card repeating mechanism and the original-card controlled means for governing the pole point changing device. Fig. 12 is an end view of the upper part of Fig. 11.

In Fig. 3, 1 indicates the stationary supporting frame and 2 the fabric frame of a jacquard embroidering machine. The fabric frame 2 has its horizontal motion imparted to it by the guide-loop 3 carried by a rack 4 and engaging with a roller 5 mounted on the fabric frame. The vertical motion of the fabric frame is effected by a rack 6 parallel to the rack 4 which engages by means of a guide-loop 6$^a$ with the lever 7 pivoted on the machine frame 1. The horizontal arm of the lever 7 carries a sector-like piece 7$^a$ on which is hung up the fabric frame by means of a horizontal guide 2$^a$. (Similar suspension means are arranged at the other end of the fabric-frame.).

The adjusting means in the jacquard mechanism for producing the horizontal fabric frame motion correspond exactly as for the construction with the adjusting means for the vertical motion; it therefore suffices to describe hereinafter only the said first means. With the rack 4 (Figs. 3 and 4) meshes a loosely rotatable toothed wheel 8 for determining the position of the fabric frame, mounted on a horizontally slidable bar 9 secured against rotation about its longitudinal axis. The bar 9 is provided at its one end, in Figs. 3 and 4 situated to the left, with a female screw by means of which it can be moved to and fro for a certain amount by a rotary spindle 10 having a corresponding worm screw in engagement with said female screw. The screw spindle 10 is secured against any axial displacement and receives an angular oscillating movement around its longitudinal axis by means of a differential wheel gear system. This movement is caused by the medium of a jacquard card and is proportional to the distance of the stitch-point to be adjusted from its corresponding zero- or pole-point. Exactly as far as the stitch-point must be apart from its zero- or pole-point in the horizontal direction, the bar 9, together with the center of the toothed wheel 8, will be displaced from its initial or zero-point position to the left by the said angular movement of the screw spindle 10. This axial displacement of bar 9 and wheel 8 takes place at a time, when the embroidering needles are still in the fabric, the fabric frame 2 being therefore still held fast by the material pressing members. As the rack 4 cannot be moved, the toothed wheel 8 will then roll on the rack 4 owing to the displacement of its center, and thereby execute a rotating movement in the direction of the arrow 11. Thus the adjusting and position determining means of the jacquard mechanism will be actuated in the first line independently of the fabric frame.

The pivot 12 (Figs. 7 and 8), on which the fabric position determining wheel 8 is loosely mounted, is fixed in the horizontally sliding bar 9, which latter has an arm 13 perpendicular to its longitudinal axis. This latter forms a guide way for a double beveled slide 14, which can be moved vertically up and down through the bent lever 15 by a cam 16 on the main shaft 15ª of the jacquard mechanism and is designed to produce the positive positioning of the fabric frame. Besides the toothed wheel 8 there is mounted on the pivot 12 also loosely movable a hanging down positioning lever 17, which carries at its lower end the two rollers 18 and 19. The distance of the latter from each other is exactly as far as the slide 14 is wide, so that the middle axis of the lever 17 coincides exactly with the longitudinal axis of the slide 14 or its guide-way 13, when the slide 14 is pushed into its upper position.

By means of a locking device the roller-lever 17 can be coupled with the toothed wheel 8. In the reinforced nave of the lever 17 are two openings 20, serving as a guide for a slide frame 21. This slide frame carries at its one end a fixed locking tooth 22 which is normally kept in engagement with the toothed wheel 8 by a spring 23 (Fig. 7). In this position of the slide frame 21 the roller lever 17 is locked or coupled with the wheel 8; it thus partakes of the above referred to rolling movement of the wheel 8, so as to swing out pendulum-like to one side. At the other end the slide frame 21 carries on a pivot a three-armed pawl-lever 24, both vertical arms of which are provided with a roller, while the horizontal arm of said lever serves as a controlling pawl. The latter is of such a length as to be out of engagement with the toothed wheel 8, when the locking tooth 22 of the slide frame 21 situated on the opposite side of the toothed wheel 8 engages into the said toothed wheel 8. By a bent lever 25, receiving its motion also from the main shaft 15ª of the jacquard mechanism by means of a cam 26 and a lever system 26ª, the slide frame 21 can be displaced horizontally, whereby the pawl-lever 24 is brought into engagement with the toothed wheel 8, while the locking tooth 22 is then disengaged therefrom. The pawl-lever 24 is normally kept in its middle-position by two traction springs 27 of the same strength. By one or the other of two controlling levers 28, 29, being actuated directly from the proper jacquard-mechanism, a turning movement in the one or other direction can be imparted to the three-armed pawl lever 24, which movement is so limited by stops 24ª, that the slide frame 21 when it has been displaced by the lever 25 and thereby has brought the pawl arm of the lever 24 into engagement with the wheel 8, and with it the positioning lever 17 will be caused to turn exactly one tooth relatively to the then stopped toothed wheel 8. At the then following return movement of the bent lever 25 the slide frame 21 will be drawn backward again by the action of the spring 23 so that the toothed wheel 8 will be coupled with the just adjusted roller lever 17 by means of the locking tooth 22. The just described means are designed to operate the transition from one pole-point to another, as it has been explained with reference to Fig. 2, for instance from $P^1$ to $P^2$ for the execution of the stitch 2.

As already has been said above in course of the explanation of the stitch determining method, the jacquard mechanism gives by its punch-hole-combinations in the jacquard card the horizontal and the vertical distance of each stitch-point from a determined pole-point. After this stitch-point has been determined by the position determining or adjusting means of the jacquard mechanism, the fabric frame will be drawn on out of its preceding position, as will be fully described hereinafter, so that it takes up the determined stitch-point position. After the fabric frame has then been stopped for the time of the stitch operation, the adjusting mechanism of the jacquard apparatus returns idle again to its former zero-position, for being then controlled again for a new stitch determination, if the new controlling adjustment shall go out from the same pole-point. If however the pole point be changed, then the zero-position changing device represented in Figs. 7 and 8 will be first actuated by one of two jacquard-needles, whereupon the distance of the new stitch-point from this last pole-point or zero-position will be determined or adjusted by the operation of proper jacquard mechanism.

From the above it may be seen that the adjusting gear of the jacquard mechanism must make a greater or less movement of oscillation in the same direction away from the same starting position according to the particular stitch-point distance.

In Figs. 5 and 6 the selecting and adjusting means of the jacquard mechanism are illustrated, and here the same constructional members are used for the horizontal and vertical movements of the fabric frame.

In Fig. 6, 30 is the card drum provided with longitudinal slots which has the known swinging movement imparted to it. Owing to this movement, those of the jacquard needles 31 which have not engaged a hole in the jacquard card 32 will be pushed back and the needle rods 33 connected to them will be brought out of range of a lifting bar 34. The latter is periodically lifted by means of a cam of the main shaft of the jacquard mechanism and is of such a length that all of the needle rods 33 not pushed back will be caught by it. On each needle rod 33 is hung a pushing rod 35 by means of two pins, which is guided at its lower end by means of a separate guide-link 36. Each time four pushing bars 35 lying next to one another in said bar system operate on a common gradation lever 37 which is mounted on the shaft 38 and has on its outer end a segment $37^a$ provided with five notches in which a stop bar 39 mounted on pivots may be engaged. For determining the stitch length in the vertical direction as well as in the horizontal direction, twelve jacquard needles and a corresponding number of needle rods 33 and bars 35 are each time provided so that for each component direction three gradation levers 37 are provided, see plan view Fig. 5, wherein the gradation lever for one component direction are situated on one side and those for the other component direction on the other side of the middle line $m$—$m$. On each gradation lever 37 four controlling pins are arranged at such distances one from the other that the pushing bars 35 engaging said pins may swing the gradation lever 37 upward from the starting position shown in the ratio 1:2:3:4, when the needle rods 33 corresponding to said pushing bars 35 are lifted by the lifting bar 34. Each of the three gradation levers 37 for one component direction operates through a change speed gear on a double differential wheel gear 40 which is mounted on the screw spindle 10 (see also Figs. 3 and 4). The change speed gear between the gradation levers and the differential mechanism 40 is so proportioned that each gradation lever imparts to said spindle 10 an angular movement in the same direction, the amount of which will depend according to whether the one or other of the needle rods 33 are lifted by the lifting bar 34 and in this example is equal to the number of units indicated in Fig. 5 within parentheses beside the controlling pins of the gradation levers. As shown in plan view in Fig. 5 and the corresponding sectional views in Fig. 6, the first gradation lever of each side (away from the middle line $m$—$m$ of the jacquard mechanism) is connected by means of a toothed segment $a$ with a double toothed wheel $b$ mounted on an intermediate shaft 41 and by this with a toothed disk $c$ on one of the main wheels of the differential wheel mechanism 40 for the transmitting of the movement in the ratio of 1:1, and further the third gradation lever is connected by means of a toothed segment $a^1$ with a double intermediate wheel $b^1$ on the shaft 41 and by this with a toothed segment $c^1$ on the supporting journal $d$ of the one planetary wheel of the wheel mechanism 40 for transmitting the movement in greater ratio, while the second gradation lever is connected by means of a toothed segment $a^2$ directly with a toothed segment $c^2$ on the supporting journal $d^1$ of the other planetary wheel of the wheel mechanism 40 for a less degree of transmission ratio, whereby no intermediate wheel is necessary between the parts $a^2$, $c^2$ as the middle double bevel wheel of the differential wheel mechanism 40 moves in the opposite direction to the two outside wheels (see arrows in Fig. 5). In the plan view of Fig. 5 the screw spindle 10 is shown moved down and laid in one plane with the shafts 38 and 41 for the sake of clearness, while actually it lies above these shafts as may be seen from Figs. 3, 4 and 6. The three gradation levers 37 for the vertical direction, as also the three gradation levers 37 for the horizontal direction of the stitch length determining arrangement, are arranged on the same shaft 38 and in the same manner all transmitting members for both directions are mounted on the common intermediate shaft 41, there of course being two screw spindles 10. According to the particular stitch length, one, two or all three gradation levers will be brought by one of the four rods 35 engaging with them into four different positions so that the corresponding spindle 10 is turned from the zero position to a maximum stroke limit through 124 movement units. As movement unit that angular movement of the spindle is taken which occurs when the rod 35 engaging the pin (1) of the first gradation lever 37 is lifted under the control of its operative needle rod 33 by the operation of the lifting bar 34. After the gradation levers 37 have been positioned, any errors in the positioning of the levers will be compensated for by the engagement of the stop bar 39 and the gradation levers will be themselves arrested so that the pushing bars 35 may again move back.

The mode of operation of the described jacquard mechanism is as follows: Consider the case in which it is desired to make a succession of stitches 1, 2, 3 according to Fig. 2 and for instance the height adjustment of the fabric frame may be explained. A row of holes or apertures is provided in the jacquard card for the vertical component length of the stitch point 1 which gives the distance $x$ from the zero position $P^1$. If this corresponds to, for instance 42 of the 125 movement units which are represented by the distance from $P^1$ to $P^2$, then simultaneously on the third gradation lever 37 (in Fig. 5 the outer one) the outer pushing rod 35 corresponding to 25 units, on the second gradation lever the third rod 35 corresponding to 15 units, and on the first gradation lever the second rod 35 corresponding to 2 units, will come into operation, that is to say the second, the seventh and the ninth jacquard needle (reckoned from the middle of the jacquard mechanism) will engage an aperture in the card 32. The remaining needles and needle bars 33 will be pushed back by the sidewise movement of the drum 30 into the dotted position (Fig. 6) so that on the following upward movement of the lifting bar 34 only the aforesaid pushing bars 35 will be lifted by means of their needle bars 33. Owing to the subsequent engagement of the stop bar 39 with the gradation levers 37 these are fixed exactly in their selection position, whereupon the pushing rods 35 return to their normal position while the lifting bar 34 is moved downward. Then the card drum 30 swings back toward the left (Fig. 6) and simultaneously draws the pushed back needle bars by means of a rail 42 (Fig. 6) again into their normal position by means of nose projections on them. After this the jacquard drum will be turned one step to present a new series of holes and the cycle of operations will again repeat in the same manner for the next stitch.

By the described angular movement of the three gradation levers 37, the corresponding spindle 10 is meanwhile turned through 42 movement units. The magnitude of this movement units and the degree of angularity of the threading of the spindle 10 are so proportioned that the sidewise displacement of the sliding bar 9 (Fig. 4) screwed on the thread of the spindle 10 exactly corresponds to the corresponding stitch distance of the pattern or to the desired fabric frame displacement. The bar 9 (the upper one in Fig. 4) has thereby exactly been displaced a distance toward the left corresponding to the distance marked $x$ in Fig. 2. As the rack 6 is still held fast, the position determining wheel 8 will turn in the direction of the arrow 11 about its own axis and will displace the roller lever 17 (Figs. 7 and 8) coupled with it, out of its middle position toward the right through an angle $\alpha$ into the position I according to Fig. 9. The fabric frame will now be released by the fabric presser device and the double wedge positioning slide 14 will be forced upward by the bent lever 15. As the thread on the spindle 10 is self-locking the pivotal point of the wheel 8 cannot be displaced sidewise and the roller lever 17 turns the toothed wheel 8 exactly through an angle $\alpha$ back into the middle position. Therefore the rack 6 (Fig. 4) engaging therewith will be moved toward the left and will, by means of the bell crank lever 7, displace the fabric frame downward so that the embroidering needles being at rest will have an upward movement relatively to the fabric frame equal to the distance $x$ (Fig. 2) from the zero position $P^1$. For the formation of the stitch the fabric frame is held by the fabric presser device or a special stop device and the bent lever 15 moves back the double wedge positioning slide 14 into its normal position. The position determining lever 17 and the position determining wheel 8 are thereby again freed and the gradation levers 37 of the adjusting gear and together with them the screw spindle 10 will also be brought back into their starting position. This return of parts is obtained in that, the stop bar 39 (Fig. 6) having released the gradation levers, a tensioned spring—it is the spring 61 indicated in Fig. 11—turns back the spindle 10 until the gradation levers 37 are brought back into their normal position. The turning back of the spindle 10 causes also the sliding bar 9 (Fig. 4) to be moved backward to the right into its initial position so that the rack 6 being at rest, the wheel 8 and the roller lever 17 will be turned from the middle position toward the left through an angle $6$ equal to $\alpha$ (Fig. 9) into the position II. During this time the determination of the second stitch 2 has been prepared by the card drum 30 (Fig. 6). This is determined from the base of the zero position $P^2$ in the vertical direction by the vertical distance component $y$ (Fig. 2) and this, for instance, may consist of 14 units. These are determined by the fourth and the sixth jacquard needle and consequently the two needle bars corresponding to these needles are left in the operative position. Further, the corresponding series of holes in the jacquard card also indicates that the zero position has been changed from $P^1$ to $P^2$. For this purpose two additional jacquard needles are arranged to lie next to the twelve jacquard needles for the stitch length components of one direction, these additional needles being connected to corresponding needle bars, which are indicated by 107 in Fig. 11. Only one of these two additional needles comes into operation at one time; by one of these the zero position is displaced upward (respectively to the right for the sidewise direction) and by the other downward (respectively toward the left for the sidewise direction). The needle bars of these two additional needles (four in all) are lifted by a separate independently controlled lifting bar—this is indicated by 105 in Fig. 11—and operate each by means of a lever system (106, 92, 93 in Fig. 11) directly on the controlling levers 28 and 29 (Fig. 7).

In the adopted example in which the zero position is changed from $P^1$ to $P^2$ upward, the lever 28 is set into operation by the corresponding additional jacquard needle and this takes place shortly before the pushing rods 35 for the stitch length determination are lifted and when the horizontal bar 9 is still in its initial position. Slightly previously also the slide frame 21 has been displaced toward the right (Fig. 7) by means of the bent lever 25, and thus the locking tooth 22 brought out of engagement with the wheel 8, while the pawl lever 24 has been brought into engagement with the toothed wheel 8. As, however, the wheel 8 cannot turn (because at this moment the rack 6 and the horizontal bar 9 are fixed), the slide frame 21 and with it the roller lever 17 will be turned a distance of one tooth division relatively to the wheel 8 in the direction of motion opposite to that of the hands of a watch and immediately afterward the said slide frame will be coupled in the new position with the wheel 8 by the returning locking tooth 22 when the bent lever 25 moves back. The toothing of the wheel 8 is so chosen that the tooth division corresponds exactly to the distance between the adjacent zero positions one from the other, that is to say, is equal to 125 movement units. The roller lever 17 is thereby turned from the position II (Fig. 9) through an angle $\gamma$ equal to 125 units into the position III. Immediately the locking tooth 22 has coupled the roller lever 17 with the wheel 8 in the new position, the pushing rods 35 for the stitch length $P^2$ to 2 equal to 14 units will be lifted and the bar 9 will be pulled toward the left by a corresponding amount. The roller lever 17 owing to the rolling movement of the wheel 8 will thereby be turned farther toward the right into the position IV through an angle $\delta$ equal to 14 units. From this latter position the roller lever 17 with the wheel 8 will be forced into the middle position by means of the double wedge positioning slide 14 now moving upward, the rack 6 will be displaced toward the left and the fabric frame will be so moved as to coincide with the stitch point 2, Fig. 2. As may be seen from Fig. 9, this distance corresponds to 125 plus 14 minus 42 equals 97 units and is equal to the distance component of the two stitch points 1 and 2 (Fig. 2) from one another.

Immediately the fabric frame is stopped at the stitch point 2 the double wedge slide 14 will again be moved downward and the bar 9 by the operation of the above mentioned spring (61 in Fig. 11) on the threaded spindle 10 will be moved back toward the right by the previously mentioned 14 units. The roller levers 17 will thereby be turned from the middle position through an angle $\epsilon$ into the position V (Fig. 10). For the stitch point 3 (Fig. 2) the jacquard card has a series of holes or apertures which gives the distance component $z$ say equal to 25 units and the change of zero position from $P^2$ to $P^1$. For said component $z$ the ninth jacquard needle has a hole in the jacquard card presented to it so that only the third gradation lever will be lifted and for the change of zero position downward the corresponding additional jacquard needle will control the controlling lever 29 (Fig. 7). Thus, according to the same cycle of operations as has been described above, the controlling lever 29 turns the roller lever 17 toward the left through an angle $\zeta$ equal to 125 units (Fig. 10) into the position VI, whereupon the adjusting gear of the jacquard mechanism will displace the bar 9 through the said 25 units toward the left and will turn the roller lever 17 through the angle $\eta$ into the position VII, and afterward the double wedge slide 14 turns the wheel 8 toward the left through the distance of this latter position from the middle position, while the rack 6 is pushed toward the right so that the fabric frame is moved upward, as compared with the embroidering needles downward to coincide with the stitch point 3 (Fig. 2). From Fig. 10 may be seen that the distance $\theta$ of the position VII from the middle position is equal to 14 plus 125 minus 25 equals 114 units which corresponds to the distance component of the stitch point 2 from the stitch point 3 in Fig. 2. For the next following stitch, the bar 9 will first be shifted toward the right into its initial position by means of the action of the restoring spring on the threaded spindle 10 and the roller lever 17 will be turned through the last 25 units toward the left, from which position the next stitch will then be determined.

From the above it is directly evident that for each stitch determination the positioning or roller lever 17 makes three consecutive movements. First toward the left out of the middle position through a distance equal to the distance component of the previous stitch point from the zero position, from here, when the zero position is changed through a distance of 125 units either to the right or to the left and then through the new stitch point distance from the zero position toward the right. The distance of this last position of the roller lever from the middle position will give the fabric frame displacement and this latter takes place in the upward direction when the last position of the roller lever was to the left from the middle position. In other cases the opposite will take place. With reference to the jacquard adjusting gear for the stitch length determination, it may be further mentioned that apart from the above described arrangement a greater or less number of pushing bars may engage with the so-called gradation levers 37.

To the left hand side of the above described jacquard mechanism will be arranged the pattern board 44 (Fig. 3) as usual in pantograph machines, on which the pattern design for the embroidery to be carried out on the machine is secured. In front of this a pantograph 43 is pivoted at the point $43^a$ on the machine frame 1 to be movable in the well known manner and all the movements of the guide pin of the pantograph will be transferred on a correspondingly smaller scale to a roller 45 of the pantograph-parallelogram. This roller engages on the one hand with a horizontal guide part 46 of a vertically movable rack 47 and on the other hand with a vertically arranged, horizontally movable guide piece 49 the horizontal movement of which is transmitted by means of a flexible tension member, for instance a chain or a steel ribbon, to a vertically movable rack 50 which is arranged parallel to the rack 47. The rack movements consequent on the operation of the pantograph 43 corresponding to the horizontal and vertical distance components of the stitch points on the pattern from a normal or zero position may be transmitted to the screw spindles 10 in the manner to be described below by a positioning mechanism and to this end the rack 47 is connected by a positioning mechanism with one spindle 10 and the rack 50 by another positioning mechanism with the other spindle 10. The construction of the said two positioning mechanisms is the same. In Figs. 11 and 12 is represented on a larger scale the positioning mechanism which connects the rack 47 with the respective screw spindle 10. In Fig. 11, 47 indicates the rack represented schematically in Fig. 3, which follows the up and down movement of the pantograph. With this rack engages a toothed wheel 48, rotatably mounted on a slide bar 52 movable in parallel direction to the rack 47 (Fig. 12). The wheel 48 can be locked on the bar 52 by means of a locking device, so that it cannot rotate any more. If then a vertical displacement of the rack 47 takes place, this movement must be transferred by the same amount and in the same direction to the bar 52. The bar 52 carries a lateral pivot 53, on which is pivoted the swinging lever 54. The latter is provided at its lower part with a sloping face 55 and can be swung out of the position shown to the right by a rod 57 engaging with a roller 56 on said lever 54. This is produced by the action of a grooved cam 58 carried by the rotary main shaft 102. As soon as the swinging lever 54 is moved to the right, a roller 60, which is pivoted on a two armed lever 59 and which has been pressed against the lower end of the bar 52 at the preceding movement of the swinging lever 54 to the left, is freed and the lever 59 is drawn toward the stop 62 by the traction of the spindle return spring 61. The left arm of the lever 59 is provided with a roller 63 located in a guide-way of a rack 64. The latter engages with a pinion 65 fastened on the respective screw-spindle 10 (see also Fig. 3). When the rack 64 strikes against the stop 62, the screw spindle 10 will be in its dead-point position and it can then be turned out of this position to the right by the descending rack 64 for the amount of the maximum stitch-length which is of together 125 units of movement in the adopted example.

As has already been said, the toothed wheel 48 is normally locked up with the bar 52 by a locking device. The latter serves at the same time as a pawl shifting device and has for its object to shift the toothed wheel 48 together with the bar 52 upward or downward relatively to the rack 47 for an amount corresponding to the maximum stitch-length of together 125 units of movement, when the movement produced by the pantograph is of such an extent, that it exceeds the adopted maximum stitch-length. The rack 47 can be vertically displaced for the whole way proportional to the total height of the embroidery pattern, the toothed wheel 48 engaging therewith, however, together with the bar 52, will be displaced upward or downward for each movement exceeding upward or downward the adopted maximum stitch-length, with the aid of automatic means arranged to shift it for the length equal to this adopted maximum stitch-length. This will be done as follows: On the upper part of the bar 52 a slide 72 is movably guided upward and downward. This latter carries at the top a locking tooth 73, engaging normally with the toothed wheel 48 under the influence of a spring 74. By a bent lever 75 the slide 72 can be lifted so that the locking tooth 73 is brought out of engagement with the toothed wheel 48. This is effected by a pushing bar 76 actuated periodically by means of a bent lever 77 and a roller rod 78 from a cam of the main shaft 102. Diametrically opposite the locking tooth 73 relatively to the toothed wheel 48 is located a two-armed pawl lever 79, rotatably mounted on the slide 72. This pawl lever only engages with the toothed wheel 48, when on lifting the slide 72 the locking tooth 73 is removed from the teeth of the wheel 48. The pawl lever 79 is normally kept in the middle position by two equally strong springs (not shown) acting against each other, so that it is obliged to engage between two teeth of the wheel 48, when the locking tooth 73 is disengaged from the latter. The pawl lever 79, when being engaged into the wheel 48, can be moved from its middle position for a certain distance to the left or to the right, which results in an angular movement of the toothed wheel 48, whereby, the rack 47 being kept fast, the bar 52 carrying the toothed wheel will be displaced upward or downward for the corresponding amount. The pawl lever 19 is turned to the one or to the other side by means of a slotted rod 80 or a similar rod 81, according as one or the other of these rods is coupled with the pawl lever 79, whereby the drive of the slotted rods 80, 81 is operated by a three-armed lever 82 from a groove in the cam 58 of the main-shaft 102. The coupling of the pawl lever 79 with one or the other slotted rods 80 or 81 is operated by two locks 83, 84 slidably guided in the pawl lever 79. Each of these locks is connected with a lever 85 or 86, pivoted on a projection of the bar 52 and having at their lower end a projecting stop nose. The levers 85 and 86 possess an unequal length and have an exactly limited space between the stop faces of the lower noses, into which a stop lever 87 can be engaged. The latter has an oscillating movement imparted to it from the main shaft 102 by means of a grooved cam 117 (Fig. 12). If the bar 52 occupies such a position relatively to the stop lever 87, that the latter does not strike the stop noses of the levers 85, 86 when it is actuated, then these latter will not be moved out of their position. On the contrary, if the bar 52 has been displaced so far upward or downward, that the nose of one of the levers 85, 86 is reached by the stop lever 87 on its movement, then the lock 83 or 84 is displaced parallel to the axis of the pawl lever 79 and put into the slot of one of the rods 80, 81, so that the pawl lever 79 partakes of the subsequent sidewise-movement of the respective rod 80 or 81 and shifts the toothed wheel 48 in such a direction, that the rack 47 being kept fast, the bar 52 will again be brought back.

The above described operation is transferred on the one hand to the corresponding screw spindle 10 of the jacquard mechanism for the displacement of the fabric frame, and on the other hand to a stitch determining drum 66 of a known kind for a card punching mechanism. The transferring mechanism which is necessary for this purpose is represented schematically in Fig. 11.

The above mentioned pawl lever 79 carries at its upper end a roller 88. If the said lever swings to the right at its upper end, it meets with a bar 89 provided with a stop piece, which bar operates the controlling lever 28 and the upper roller of the three-armed pawl lever 24 of the pole-point changing device of the jacquard mechanism, by means of a bent lever 90, a link 91, a lower bent lever 92 and the connecting rod 93. If the pawl lever 79 swings at its upper end to the left, it acts upon a second pushing bar 89$^a$ similar in all respects to the bar 89, and which operates the controlling lever 29 and the lower roller of the above named three armed pawl lever 24 by a lever system of the same kind (not shown). To the link 91 mentioned before is also attached a bent lever 94, which actuates by its upper end a slide bar 95. This latter slides at its front end in a vertically movable cross piece 96 as it is usually employed in jacquard punching machines. The cross piece 96 is provided with a series of guide holes for a row of punches 97, each of which presents a head 98. One of these punches belongs to the said slide bar 95 and a second one to a similar, not shown slide bar, which, like the first one, but by the bar 89$^a$, is dependent on the pawl lever 79, while the other punches serve also for the punching of the card but according to the different stitch lengths which are inferior to the adopted maximum stitch length. The cross piece 96 receives an up and down movement from a cam disk 100 being actuated by the main shaft 102 through suitable intermediate means. If any one of the slide bars 95 is in the position shown, the corresponding punch 97 can give way upward at the going down of the cross piece 96 and is not pressed down upon the jacquard card 101 passing under the punches. If, on the contrary, the said slide bar 95 is pushed to the left, it puts itself with its forward end above the corresponding punch 97, so that the latter is pressed down at the subsequent downward movement of the cross piece 96 and punches a hole through the jacquard card 101.

The two outermost slide bars 95 serve, as is seen from the preceding, to control the punching of holes in the card for indicating any occurring pole-point change in the jacquard mechanism. The remaining slide bars 95 serve to control the punching for all the stitch lengths inferior to the adopted maximum stitch length and taken from the same pole-point. For this purpose the last named slide bars 95 are connected each with a bent lever 68 having a jacquard needle 67 opposite the stitch-determining drum 66 and carrying an upwardly projecting arm 68$^a$ being under the pull of a spring 69 in contact with a common cross roller 70$^a$ on a stop bar 70, which is connected to a bent lever 71 and is controlled through this latter by a cam 103 on the shaft 102. At each revolution of the shaft 102 the cam 103 releases the bent levers 68 by means of the stop bar 70, in such a manner that the levers are swung out under the control of their springs 69, for the purpose of bringing their needles 67 toward the drum 66. As the circumference of the drum 66 has holes and slots in the manner shown in its development at 66$^a$ it will be seen that if for example a hole of said drum is presented to the needle 67 of one of the said bent levers 68, the latter will be capable of executing a sufficient oscillating movement to move the corresponding slide bar 95 forward over the corresponding punch 97 and to thus couple this latter with the cross piece 96, so that on the subsequent downward movement of the cross piece 96 under the action of the cam disk 100, a corresponding hole is punched in the jacquard card 101. The hole and slot arrangement of the stitch determining drum 66 for obtaining a very great number of stitch combinations is substantially known (see the development 66ª). In one part of the drum circumference are situated the unit stitch holes, in an adjacent part the stitch slots for five units and farther on the stitch slots for 25, 50, 75 and 100 units, so that, if, for instance the drum 66 is opposite the needles 67 along the line $x$, there is obtained a stitch length of 4 units, while along the line $x^1$ a stitch length of 14 units, along the line $x^2$ a stitch length of 25 units, along the line $x^3$ a stitch length of 42 units, and so on, is obtained.

During the punching operation the proper jacquard-mechanism is at rest. But also during the working of the jacquard mechanism together with the embroidering machine the described punching mechanism can be set into action, for the purpose of getting a copy of an original jacquard card. This will be done by means of a known repeating mechanism. With the aid thereof there may be obtained the locking of the punches 97 in the movable cross piece 96 in a known manner in dependence of the punched pattern card 32 by lifting the needle bars 33, 107 (Fig. 11) by means of the lifting bar 105 separate from the lifting bar 34 (Fig. 6). Among these needle bars the outermost 107 on both sides are dependent on the pawl lever 79 by means of two corresponding pushing rods 106 and the lever system 92, 91, 90, while the other needle bars 33 are those which, by the pushing rods 35, engage with the gradation levers 37 in the manner described above with respect to Fig. 6, said gradation levers operating, when controlled by one of the corresponding jacquard needles, the respective screw spindle 10 and therefore the stitch determining drum 66 fixed thereto. The pushing rods 106 are provided at the top with a slot, in which can slide freely a pin on the levers 92, if the card punching mechanism is controlled manually by means of the pantograph with respect to the exceeding of the adopted maximum stitch length (pole point changing) and to the unit stitch lengths.

The operation of the card punching mechanism takes place completely automatically and the activity of the embroiderer consists solely in the operation of following with the pantograph needle the stitch points of the pattern-design fastened on the pattern-board 44. For the sake of simplicity, only the adjusting and transmitting means for the vertical component direction may be considered, which means are controlled by the pantograph by means of the rack 47 and the wheel 48 (Fig. 3), as for the horizontal component direction similar adjusting and transmitting means are provided, but these are moved by means of the rack 50 and the wheel 51. On a vertical displacement of the pantograph the rack 47 (Fig. 3) follows this movement of the pantograph in a corresponding proportion and carries by the locked wheel 48 (Figs. 11 and 12) the vertical bar 52 along with it for the same amount. During this time the swinging lever 54 is swung out to the right and the two armed lever 59 is drawn toward the stop 62 by the spring 61. Besides, the roller 60 or its pivot has also been displaced laterally in the lever 59 (from the position shown in Fig. 12 to the left) and this positively by means of a lever 109, controlled by a cam 112 of the main shaft 102 through the medium of a convenient lever system. Consequently, the bar 52 is freely movable in the vertical direction and cannot strike against the roller 60. Now the rack 47 operated manually by the pantograph is stopped for the subsequent operations and this by a locking lever 110 (Fig. 11) with the aid of the spring 111. As soon as this has been done, the stop lever 87 (Fig. 12) makes a movement to the left and strikes against the lower stop nose of one or the other lever 85 or 86, when the bar 52 has been shifted upward or downward over a stroke exceeding the adopted maximum stitch length. Thereby the pawl lever 79 is coupled with one of the two slotted rods 80, 81, and, after the locking tooth 73 has been released shortly before by its controlling mechanism 75, 76, 77, 78 and the pawl lever 79 has been engaged into the wheel 48, the coupled rod 80 or 81 turns the pawl lever 79 and with it the toothed wheel 48 under the action of the lever 82 to the left or to the right and thereby brings back the vertical bar 52, the rack 47 being kept fast, for an extent corresponding to the adopted maximum stitch length, so that it stands out of its zero-position only by the amount for which its stroke exceeds the stroke corresponding to the maximum stitch length. At the same time as the aforesaid return movement of the bar 52 is effected, the parts 89, 90, 91, 92, 93, 28, produce a corresponding displacement of the roller lever 17 relatively to the toothed wheel 8 in the positioning device of the jacquard mechanism, after the adjustment of which the slide 14 effects by its action upon the roller lever 17 the positioning of the fabric frame to the desired stitch point. Thereupon the slide 72 is moved downward and locks by means of the locking tooth 73 the toothed wheel 48 in its new position with the bar 52, while the pawl lever 79 leaves at the same time the teeth of the wheel 48 and can, when the corresponding hole is punched in the jacquard card, swing back again to its middle position at the return stroke of the slotted rod 80 or 81. During these operations the roller 60 has been brought into its operative position by the lever 109, that is to say between the lower end of the vertical bar 52 and the sloping face 55 of the swinging lever 54. If the swinging lever 54 is then moved to the left during the rotation of the main shaft 102 it engages the roller 60 and presses it against the lower stop face of the vertical bar 52. Thereby the rack 64 is moved from its position of rest downward and the screw spindle 10 with the stitch determining drum 66 is rotated to the right for a proportional amount by the toothed wheel 65 meshing with said rack. Now the cam 103 on the shaft 102 releases the lever system 70, 71 and the needles 67 of the levers 68 will immediately swing toward the stitch determining drum 66 under the pull of the springs 69, while in the meantime the fabric frame has been positioned by the described positioning means according to the adjusting stroke of the screw spindle 10 in the controlling mechanism of the jacquard work. Meanwhile the holes for the pole-point change have also been punched in the jacquard card to be repeated, as well as the holes for the desired stitch length combination, owing to the fact that one or the other of the slide bars 95 operated by the parts 89, 90, 91, 94, and one or the other or several of the slide bars 95 controlled by the drum 66 have caused the coupling of the corresponding punches 97 with the movable cross piece 96 actuated by the rotating cam 100. As soon as this has been done, the swinging lever 54 (Fig. 11) is moved to the right and the roller 60 drawn to the left (Fig. 12). At the same time the locking of the rack 47 is taken up as the lever 110 is turned against the action of the spring 111, and the pantograph 43 is freed again for the adjusting operation of a new stitch, the rack 47 and the vertical bar 52 connected therewith being disconnected from the screw spindle 10.

What I claim is:

1. In embroidering machines, a jacquard mechanism for moving the fabric frame, comprising for each stitch component direction a fabric frame positioning gear normally in a zero position, loose interconnecting means between said gear and the fabric frame, means for adjusting said positioning gear according to the desired stitch length from its zero position independently of the fabric frame, selecting means for controlling said adjusting means, a jacquard card for controlling said selecting means, automatic control means for engaging said interconnecting means to bring the fabric frame up to the positioning gear determined position, and a change device in combination with said positioning gear for causing an additional adjustment thereof over an extent corresponding to an adopted maximum stitch length in view of an exchange of its actual zero position with another zero position, when the desired stitch length exceeds said maximum limit, substantially as described.

2. In embroidering machines, a jacquard mechanism for moving the fabric frame, comprising for each stitch component direction a fabric frame positioning gear normally in a zero position, loose interconnecting means between said gear and the fabric frame, means for adjusting said positioning gear according to the desired stitch length from its zero position, independently of the fabric frame, selecting means for controlling said adjusting means, a jacquard card for controlling said selecting means, automatic control means for engaging said interconnecting means to bring the fabric frame up to the positioning gear determined position, an automatic return device for restoring said adjusting means and positioning gear to their zero position after the fabric frame having been positioned, and a change device in combination with said positioning gear for causing an additional adjustment thereof over an extent corresponding to an adopted maximum stitch length in view of an exchange of its actual zero position with another zero position, when the desired stitch length exceeds said maximum limit, substantially as described.

3. In embroidering machines, a jacquard mechanism for moving the fabric frame, comprising for each stitch component direction a fabric frame positioning gear normally in a zero position, loose interconnecting means between said gear and the fabric frame, means for adjusting said positioning gear according to the desired stitch length from its zero position, independently of the fabric frame, selecting means for controlling said adjusting means, a jacquard card for controlling said selecting means, automatic control means for engaging said interconnecting means to bring the fabric frame up to the positioning gear determined position, an automatic return device for restoring said adjusting means and positioning gear to their zero position after the fabric frame having been positioned, and a jacquard card controlled change device in combination with said positioning gear for causing an additional adjustment thereof over an extent corresponding to an adopted maximum stitch length in view of an exchange of its actual zero position with another zero position, when the desired stitch length exceeds said maximum limit, substantially as described.

4. In embroidering machines, a jacquard mechanism for moving the fabric frame, comprising for each stitch component direction a fabric position determining rotary toothed wheel normally in a zero position, a rack connected to the fabric frame and intermeshing with said toothed wheel, a slidable bar carrying said toothed wheel, a rotary adjusting spindle, a screw device connecting said bar and spindle and arranged to produce a sliding motion of the bar when the spindle is rotated, an adjusting wheel gearing for imparting to said spindle a variable rotating movement according to the desired stitch length, selecting means for controlling said adjusting wheel gearing, a jacquard card for controlling said selecting means, a positioning lever connected to said fabric position determining wheel so as to partake of its adjusting movement, a positioning member arranged to coöperate with said positioning lever and to bring it back to its starting or zero position, together with said wheel, in order to position the fabric frame by means of said rack, and automatic driving means for positively actuating said positioning member, substantially as described.

5. In embroidering machines, a jacquard mechanism for moving the fabric frame, comprising for each stitch component direction a fabric position determining rotary toothed wheel normally in a zero position, a rack connected to the fabric frame and intermeshing with said toothed wheel, a slidable bar carrying said toothed wheel, a rotary adjusting spindle, a screw device connecting said bar and spindle and arranged to produce a sliding motion of the bar when the spindle is rotated, an adjusting wheel gearing for imparting to said spindle a variable rotating movement according to the desired stitch length, selecting means for controlling said adjusting wheel gearing, a jacquard card for controlling said selecting means, a positioning lever combined with said fabric position determining wheel, releasable connecting means for coupling together said wheel and positioning lever, designed to allow said positioning lever to be moved relatively to said fabric position determining wheel, a positioning member arranged to coöperate with said positioning lever and to bring it back to its starting or zero position, together with said wheel, in order to position the fabric frame by means of said rack, and automatic driving means for positively actuating said positioning member, substantially as described.

6. In embroidering machines, a jacquard mechanism for moving the fabric frame, comprising for each stitch component direction a fabric position determining rotary toothed wheel normally in a zero position, a rack connected to the fabric frame and intermeshing with said toothed wheel, a slidable bar carrying said toothed wheel, a rotary adjusting spindle, a screw device connecting said bar and spindle and arranged to produce a sliding motion of the bar when the spindle is rotated, an adjusting wheel gearing for imparting to said spindle a variable rotating movement according to the desired stitch length, selecting means for controlling said adjusting wheel gearing, a jacquard card for controlling said selecting means, a positioning lever combined with said fabric position determining wheel, a locking slide on said positioning lever for detachably connecting it with said wheel, means for controlling said locking slide to cause disconnection between said wheel and lever, a pawl device arranged to be engaged with said fabric position determining wheel when the positioning lever is disconnected from said wheel, means for actuating said pawl device to cause it to move the positioning lever relatively to the fabric position determining wheel when it is engaged with the latter, a positioning member arranged to coöperate with said positioning lever and to bring it back to its starting or zero position, together with said wheel, in order to position the fabric frame by means of said rack, and automatic driving means for positively actuating said positioning member, substantially as described.

7. In embroidering machines, a jacquard mechanism for moving the fabric frame, comprising for each stitch component direction a fabric position determining rotary toothed wheel normally in a zero position, a rack connected to the fabric frame and intermeshing with said toothed wheel, a slidable bar carrying said toothed wheel, a rotary adjusting spindle, a screw device connecting said bar and spindle and arranged to produce a sliding motion of the bar when the spindle is rotated, an adjusting wheel gearing for imparting to said spindle a variable rotating movement according to the desired stitch length, selecting means for controlling said adjusting wheel gearing, a jacquard card for controlling said selecting means, a positioning lever combined with said fabric position determining wheel, a locking slide on said positioning lever for detachably connecting it with said wheel, means for controlling said locking slide to cause disconnection between said wheel and lever, a pawl device arranged to be engaged with said fabric position determining wheel when the positioning lever is disconnected from said wheel, jacquard card controlled means for actuating said pawl device to cause it to move the positioning lever relatively to the fabric position determining wheel when it is engaged with the latter, a positioning member arranged to coöperate with said positioning lever and to bring it back to its starting or zero position, together with said wheel, in order to position the fabric frame by means of said rack, and automatic driving means for positively actuating said positioning member, substantially as described.

8. In embroidering machines, a jacquard mechanism for moving the fabric frame comprising for each stitch component direction a fabric frame positioning gear normally in a zero position, loose interconnecting means between said gear and the fabric frame, means for adjusting said positioning gear according to the desired stitch length from its zero position independently of the fabric frame, selecting means for controlling said adjusting means, a jacquard card for controlling said selecting means, automatic control means for engaging said interconnecting means to bring the fabric frame up to the positioning gear determined position, a change device in combination with said positioning gear for causing an additional adjustment thereof by an extent corresponding to an adapted maximum stitch length, when the desired stitch length exceeds this maximum limit, a pantograph controlled adjusting mechanism, releasable interlocking means connecting said pantograph controlled adjusting mechanism with said fabric frame positioning gear, stitch determining means arranged to be operated by said pantograph mechanism, and a jacquard card punching mechanism dependent on said stitch determining means, and connected to said pantograph controlled adjusting mechanism as well as to said change device of the jacquard mechanism, substantially as described.

9. In embroidering machines, a jacquard mechanism for moving the fabric frame comprising for each stitch component direction a fabric frame positioning gear normally in a zero position, loose interconnecting means between said gear and the fabric frame, means for adjusting said positioning gear according to the desired stitch length from its zero position independently of the fabric frame, selecting means for controlling said adjusting means, a jacquard card for controlling said selecting means, automatic control means for engaging said interconnecting means to bring the fabric frame up to the positioning gear determined position, a change device in combination with said positioning gear for causing an additional adjustment thereof by an extent corresponding to an adapted maximum stitch length, when the desired stitch length exceeds this maximum limit, a pantograph controlled adjusting mechanism having a movable bar, an adjusting gear, an interlocking device between them for allowing of the adjustment of said bar under the control of the pantograph, and an automatically controlled shifting lever for said adjusting gear designed to operate when said bar has been adjusted beyond a maximum limit stroke corresponding to the adopted maximum stitch length, stitch determining means, actuating means for the fabric frame positioning gear and said stitch determining means, interconnecting means between said movable bar and said actuating means to determine the movement thereof by an extent corresponding to the position of said bar, and a jacquard card punching mechanism dependent on said stitch determining means and connected to said shifting lever of the pantograph controlled adjusting mechanism as well as to said change device of the jacquard card, substantially as described.

10. In embroidering machines, a jacquard mechanism for moving the fabric frame comprising for each stitch component direction a fabric frame positioning gear normally in a zero position, loose interconnecting means between said gear and the fabric frame, means for adjusting said positioning gear according to the desired stitch length from its zero position independently of the fabric frame, selecting means for controlling said adjusting means, a jacquard card for controlling said selecting means, automatic control means for engaging said interconnecting means to bring the fabric frame up to the positioning gear determined position, a jacquard card controlled change device in combination with said positioning gear for causing an additional adjustment thereof by an extent corresponding to an adopted maximum stitch length, when the desired stitch length exceeds this maximum limit, a pantograph controlled adjusting mechanism having a movable bar, an adjusting gear and an interlocking device between them for allowing of the adjustment of said bar under the control of the pantograph, stitch determining means, actuating means for the fabric frame positioning gear and said stitch determining means, interconnecting means between said movable bar and said actuating means to determine the movement thereof by an extent corresponding to the position of said bar, a jacquard card punching mechanism dependent on said stitch determining means, additional means in said pantograph controlled adjusting mechanism and jacquard card punching mechanism for causing the punching of the holes in the jacquard card when the bar adjustment under the control of the pantograph exceeds the adopted maximum stitch length, substantially as described.

In witness whereof I have hereunto signed my name this 30th day of March 1912, in the presence of two subscribing witnesses.

KARL KELLER.

Witnesses:
 D. I. MURPHY,
 EDWIN KOLLER.

---

Copies of this patent may be obtained for five cents each, by addressing the "Commissioner of Patents, Washington, D. C."